(12) United States Patent
Higuchi

(10) Patent No.: US 6,212,241 B1
(45) Date of Patent: Apr. 3, 2001

(54) DIGITAL MODULATED SIGNAL RECEIVER

(75) Inventor: Norihiko Higuchi, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/931,767

(22) Filed: Sep. 16, 1997

(30) Foreign Application Priority Data

Sep. 18, 1996 (JP) .................................................. 8-246619

(51) Int. Cl.[7] .................................................. H04L 25/34
(52) U.S. Cl. .................................................. 375/286; 375/377
(58) Field of Search .................................. 375/286, 216, 375/355, 372, 324; 341/142, 155

(56) References Cited

U.S. PATENT DOCUMENTS

| | | | |
|---|---|---|---|
| 4,510,569 | * | 4/1985 | Takoa et al. ........................... 341/142 |
| 5,081,454 | * | 1/1992 | Campbell, Jr. et al. ............. 341/141 |
| 5,422,807 | * | 6/1995 | Mitra et al. ........................... 341/142 |
| 5,533,062 | * | 7/1996 | Liberti, Jr. et al. ................... 375/334 |
| 5,790,607 | * | 8/1998 | Burke et al. ........................... 375/355 |
| 5,901,149 | * | 5/1999 | Itakura et al. ........................ 370/468 |

FOREIGN PATENT DOCUMENTS 7-99680    4/1995 (JP) .

* cited by examiner

*Primary Examiner*—Chi Pham
*Assistant Examiner*—Kevin M Burd
(74) *Attorney, Agent, or Firm*—Young & Thompson

(57) ABSTRACT

A radio receiver receives a 4-FSK signal through a radio system and a detector detects a four-level detected signal from the 4-FSK signal. The four-level detected signal is converted into digital form by an AD converter. The digital signal is stored onto a memory. The AD conversion is performed at intervals obtained from the four-level detected signal. A CPU performs the data processing of the received digital data when the AD conversion is not performed and does not perform it when the AD conversion is performed.

21 Claims, 5 Drawing Sheets

DIGITAL MODULATED SIGNAL RECEIVER

BACKGROUND OF THE INVENTION

1. Field of the Invention

The present invention relates to a radio receiver and, more specifically, to a radio receiver which receives a digital-modulated signal to produce received data through an analog-to-digital converter.

2. Description of the Related Art

In general, a radio receiver such as a pager employs an intermittent receiving scheme so as to save the battery power. Further, there has been proposed a system which can stop supplying main clock pulses to a CPU during each receiving period to stabilize the radio receiving characteristics. In Japanese Patent Unexamined Publication No. 7-99680, for example, a portable data processing apparatus is provided with an I/O slot into which a radio pager can be detachably connected. When the radio pager is receiving a radio signal, the radio pager outputs a control signal to the data processing apparatus, and thereby the main clock signal supplied to the CPU of the data processing apparatus is stopped or switched to a sub clock signal of a lower frequency during the receiving period so as to avoid causing the harmonics of the main clock to influence the radio receiving characteristics. After the receiving operation is completed, the main clock signal is supplied to the CPU and thereby the CPU starts performing data processing of the received data.

SUMMARY OF THE INVENTION

In recent years, as one measure to accommodate the increasing transmission rate, a multi-level digital modulation technique such as M-ary FSK (frequency shift keying) has been employed. Especially, the 4-ary FSK modulation format is used in many wireless applications. Since the multi-level digital modulation allows a larger amount of data to be transmitted, a message of increased length of can be transmitted at a time to a radio selective call receiver such as a pager.

In the case of the radio selective call receiver, however, the received data is temporarily stored onto a memory and, after the receiving operation is completed, the received data stored in the memory is read and processed by a CPU supplied with the main clock. Therefore, when receiving a large amount of data which exceeds the capacity of the memory, the CPU has to process the received data according to the main clock during the receiving operation. This may raise the possibility that the harmonics of the main clock pulses adversely influence the radio sensitivity characteristics of the radio system.

An object of the present invention is to provide a receiver and a timing control method which can receive a digital-modulated signal with reliability and stability while processing received digital data.

Another object of the present invention is to provide a radio selective call receiver which can receive a large amount of data without effect on the receiving characteristics.

According to the invention, in a receiver having an AD converter through which a multi-level detected signal is converted into digital form, the data processing of the digital signal is performed when the AD converter does not perform AD conversion of the multi-level detected signal. Since the multi-level detected signal is input through the AD converter when the data processing is not performed, the data can be received without effect on the receiving characteristics.

According to an aspect of the present invention, a receiver includes a detector for detecting a multi-level detected signal from the digital-modulated signal and an AD converter for converting the multi-level detected signal to a digital signal at intervals determined based on the multi-level detected signal. The receiver further includes a first controller which controls a plurality of operations of the radio receiver, the operations including data processing of the digital signal, and a second controller which controls the operation timing of the first controller such that the first controller performs the data processing within a time period during which the AD converter does not perform AD conversion of the multi-level detected signal.

According to another aspect of the present invention, a radio selective call receiver further includes a decoder for decoding the digital signal to produce received data and a memory for storing the received data. A timing controller controls AD conversion timing of the AD converter such that the AD conversion is performed at intervals determined based on the multi-level detected signal. A data processor processes data to perform a plurality of operations of the radio selective call receiver, the operations including data storing and data processing of the received data, wherein the data processing of the received data is performed within a time period during which the AD conversion is not performed.

DESCRIPTION OF THE PREFERRED EMBODIMENT

Figure 1:
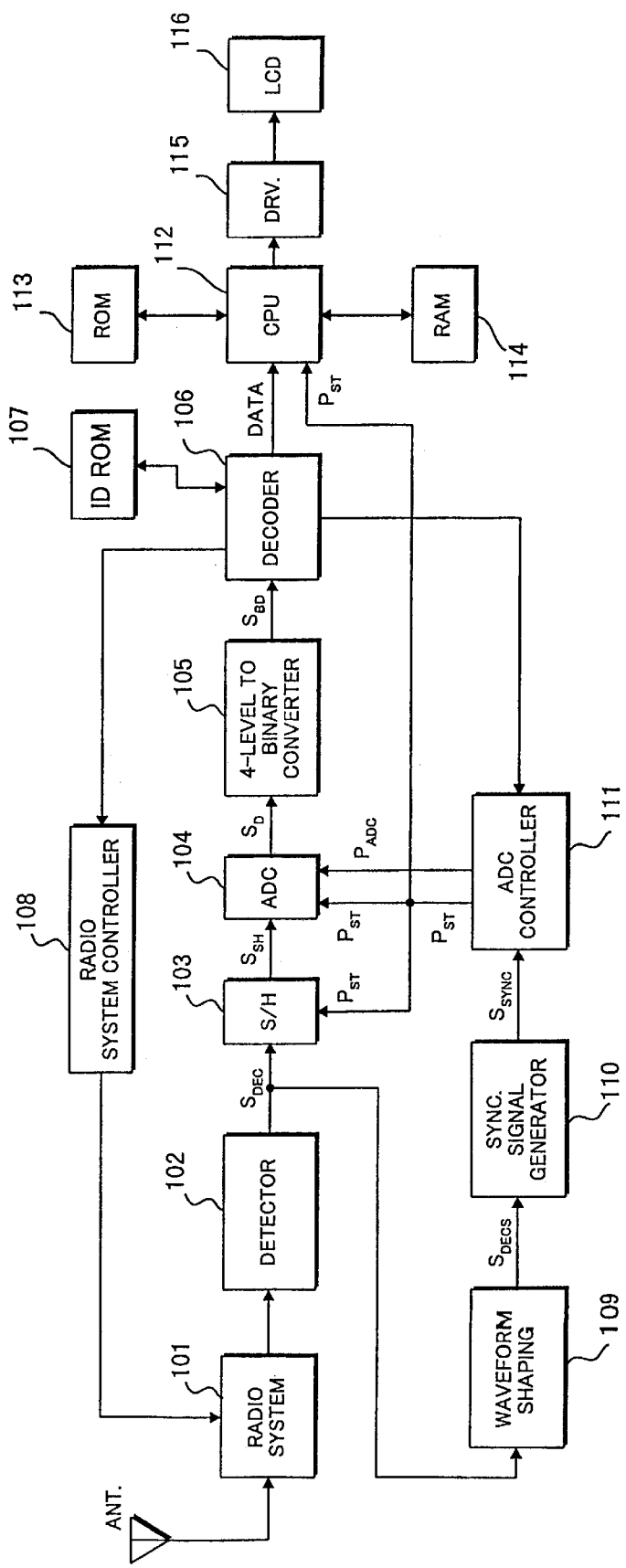
FIG. 1 is a block diagram showing a radio selective call receiver according to an embodiment of the present invention.

Referring to FIG. 1, a radio system 101 receives a radio signal from a radio base station (not shown) of a radio communications system through a receiving antenna. The radio system 101 amplifies the received signal and outputs it to a detector 102 such as a frequency-discriminator detector. The detected signal $S_{DEC}$ (here, a four-level signal) of the detector 102 is output to both a sample and hold circuit 103 and a waveform shaping circuit 109.

The sample and hold circuit 103 samples the detected signal $S_{DEC}$ and holds the signal voltage at that time according to a conversion start pulse $P_{ST}$. The sampled voltage $S_{SH}$ of the sample and hold circuit 103 is converted to a digital signal $S_D$ by an analog-to-digital converter (ADC) 104. The analog-to-digital conversion is started by the conversion start pulse $P_{ST}$ and is performed according to an ADC clock signal $P_{ADC}$. The digital signal $S_D$ is produced from the sampled voltage $S_{SH}$ which is a four-level analog signal. Therefore, a 4-level-to-binary converter 105 converts it from four-level into binary to produce a binary received signal $S_{BD}$ which is output to a decoder 106.

The decoder 106, when receiving the binary received signal $S_{BD}$, decodes it into received data and then compares the selective calling number included in the received signal $S_{BD}$ with an identification (ID) number previously stored in an ID read-only memory (ROM) 107. A radio system controller 108 performs a battery-saving control of the radio system 101 under the control of the decoder 106.

The waveform shaping circuit 109 shapes the wave form of the detected signal $S_{DEC}$ by comparing the detected signal $S_{DEC}$ with a predetermined reference voltage to produce a waveform-shaped detected signal $S_{DECS}$. A sync signal generator 110 generates a sync timing signal $S_{SYNC}$ synchronizing with the detected signal $S_{DECS}$. The sync timing signal $S_{SYNC}$ is output to an ADC controller 111 which generates the conversion start pulse $P_{ST}$ and the ADC clock signal $P_{ADC}$ in synchronization with the sync timing signal $S_{SYNC}$ under the control of the decoder 106. As described before, the sample and hold circuit 103 and the ADC 104 are controlled by the conversion start pulse $P_{ST}$ and the ADC clock signal $P_{ADC}$, respectively.

Further, the ADC controller 111 outputs the conversion start pulse $P_{ST}$ to a micro processor (or a CPU) 112 which has a capability of clock switching depending on whether the radio system 101 is operated as described before. The CPU 112 performs data processing according to a program stored in a ROM 113. The ADC controller 111 may be incorporated in the decoder 106.

When the selective calling number included in the received signal $S_{BD}$ is identical to the ID number, the decoder 106 outputs a received message included in the received signal $S_{BD}$ to the CPU 112 and then the message is stored onto a RAM 114. The CPU 112 controls a display driver 115 such that the message is displayed on a liquid crystal display 116 depending on user's instructions. In this figure, a sounder for informing a user of an incoming call and a keypad for inputting user's instructions are not shown.

The main clock signal is supplied to the CPU 112 based on the conversion start pulse $P_{ST}$ received from the ADC controller 111. Here, the CPU 112 operates according to the main clock when the receiving operation is not performed by the radio system 101. On the other hand, when the receiving operation is performed, the CPU 112 normally stores the received data onto a RAM 114 according to the sub clock, that is, the main clock is not supplied to the CPU 112. However, as described before, in the case where a long message is received and the RAM 114 becomes full, the CPU 112 has to perform high-speed data processing according to the main clock. According to the present invention, the CPU 112 can perform the high-speed data processing without effect on the received data. The details will be described hereinafter.

OPERATION

Figure 2A:
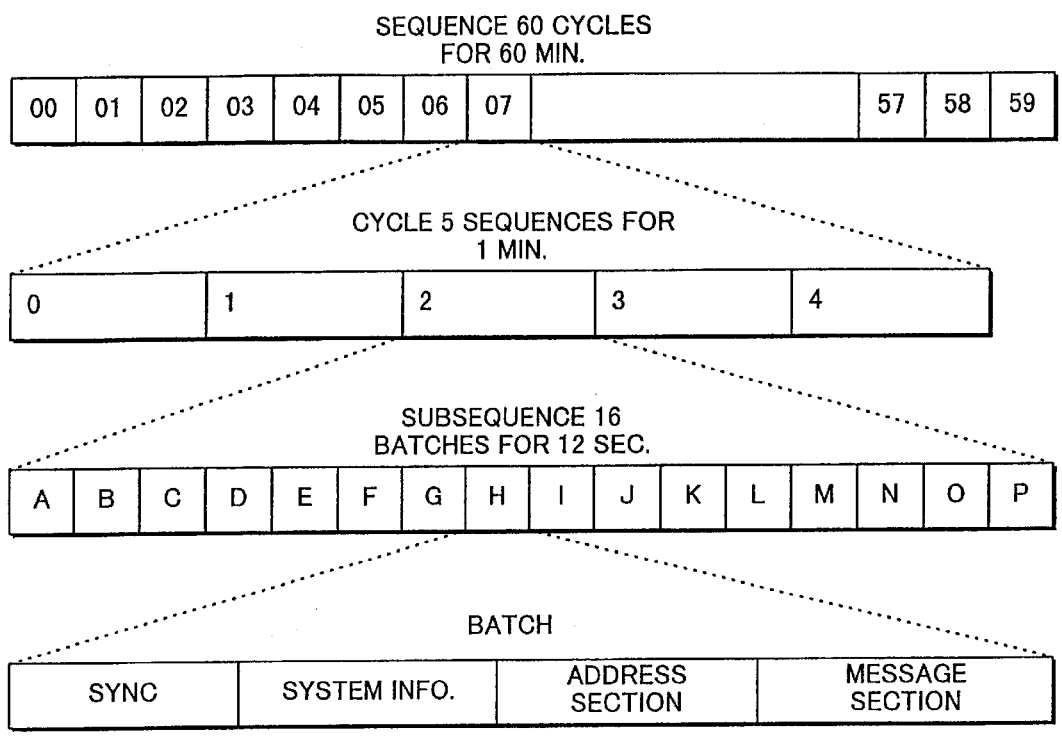
FIG. 2A is a diagram showing an example of a transmission signal format employed in a radio communications system.

Referring to FIG. 2A, a radio base station transmits a transmission signal having the signal format of ERMES (European Radio Message System) for example. More specifically, one sequence consists of 60 cycles for 60 minutes, each cycle consisting of 5 subsequences for one minute. Each subsequence consists of 16 batches for 12 seconds, each batch including a synchronization pattern, system information, an address section, and a message section.

Figure 2B:
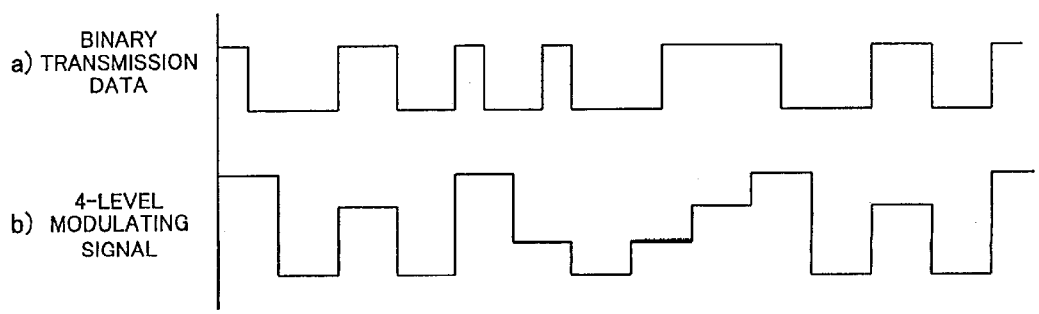
FIG. 2B is a waveform chart showing a binary transmission signal and the corresponding 4-level modulating signal in a transmitter of the radio communications system.

As shown in FIG. 2B, binary transmission data is assembled according to the signal format of FIG. 2A and then it is transformed into a stream of four-level pulses which is used as a 4-ary FSK modulating signal to produce a 4-ary FSK-modulated radio signal. Such a 4-ary FSK-modulated radio signal is received by the radio selective call receiver of FIG. 1.

Figure 3:
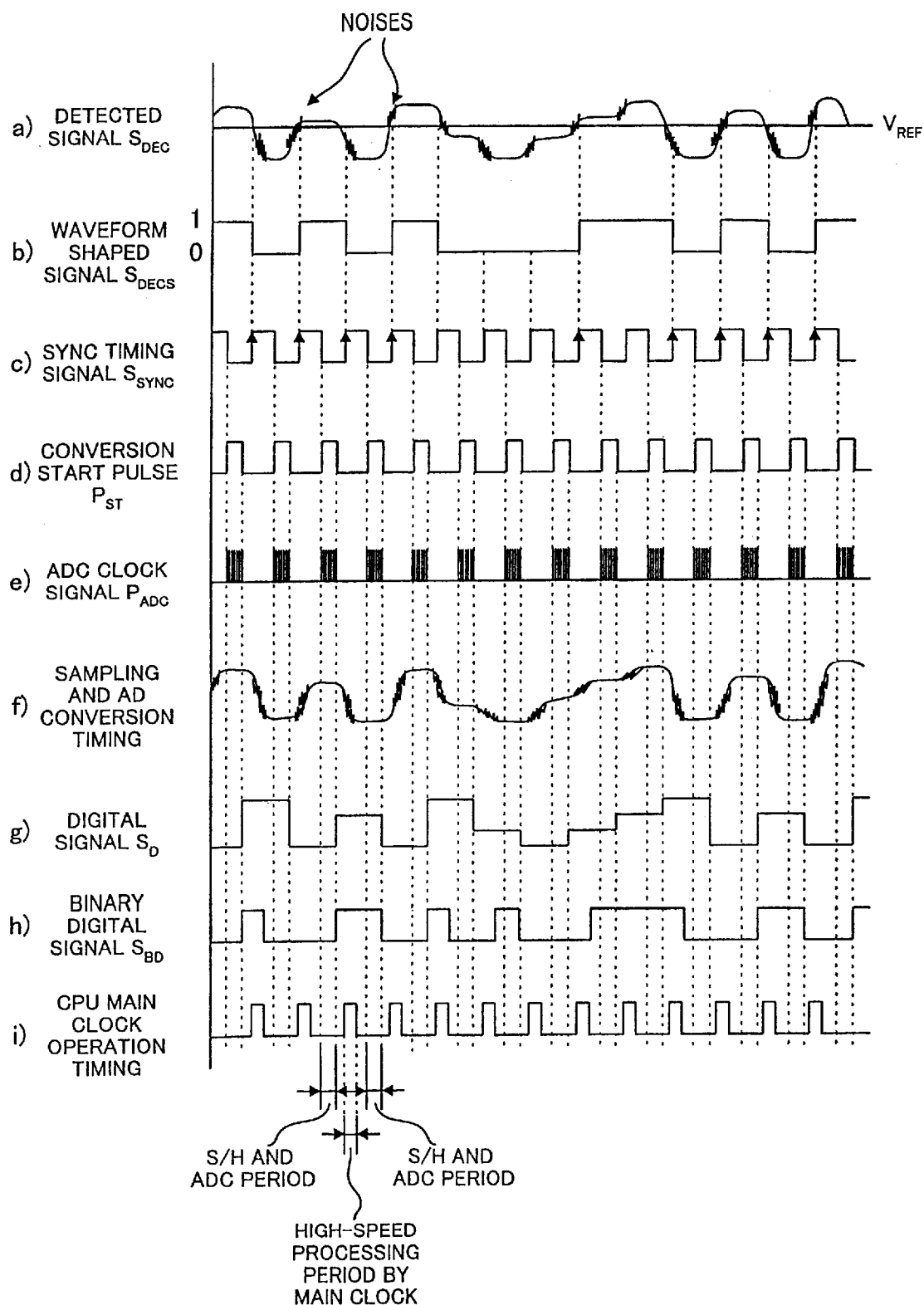
FIG. 3 is a waveform chart showing an operation of the radio selective call receiver according to the embodiment.

Referring to FIG. 3, there is shown signal wave forms in the embodiment when the radio system 101 is operated, that is, the battery saving is off. In FIG. 3, the detected signal $S_{DEC}$ (four-level analog signal) is detected from the 4-ary FSK-modulated radio signal by the detector 102 as shown in (a) of FIG. 3. The waveform shaping circuit 109 compares the detected signal $S_{DEC}$ with a predetermined reference voltage $V_{REF}$ to produce a binary waveform-shaped signal $S_{DECS}$ as shown in (b) of the figure. When receiving the binary waveform-shaped signal $S_{DECS}$, the sync signal generator 110 generates the sync timing signal $S_{SYNC}$ synchronizing therewith as shown in (c) of the figure. The ADC controller 111 generates the conversion start pulse $P_{ST}$ and the ADC clock signal $P_{ADC}$ in synchronization with the sync timing signal $S_{SYNC}$. The conversion start pulse $P_{ST}$ rises on the trailing edge of the sync timing signal $S_{SYNC}$ and falls after a lapse of a predetermined time period which is required for AD conversion of the ADC 104 as shown in (d) of the figure. Therefore, the ADC 104 starts the AD conversion on the leading edge of the conversion start pulse $P_{ST}$ and performs the AD conversion according to the ADC clock signal $P_{ADC}$ during the pulse width of the conversion start pulse $P_{ST}$ as shown in (e) of the figure.

In this manner, the sample and hold operation and the AD conversion are performed at the timing as shown in (f) of the figure, and thereby the digital signal $S_D$ is produced which is shown in an analog fashion in (g) of the figure. The digital signal $S_D$ is converted into binary by the 4-level-to-binary converter 105 to produce a binary received signal $S_{BD}$ as shown in (h) of the figure.

On the other hand, the ADC controller 111 outputs the conversion start pulse $P_{ST}$ by which the CPU 112 determines the main clock operation timing as shown in (i) of the figure. More specifically, the main clock operation of the CPU 112 is started after the trailing edge of each conversion start pulse $P_{ST}$ and is stopped before the leading edge of the subsequent conversion start pulse $P_{ST}$. In other words, the high-speed data processing according to the main clock is performed by the CPU 112 during intervals between conversion start pulses $P_{ST}$. As shown in (a) of the figure, noises due to the harmonics of the main clock occur at the CPU main clock operations. Since the CPU 112 stops high-speed data processing by the main clock during S/H and AD conversion periods, the detected signal $S_{DEC}$ which is not influenced by the main clock is sampled and converted to produce the digital signal $S_D$. The details of data processing timing control will be described hereinafter.

DATA PROCESSING TIMING CONTROL

Figure 4:
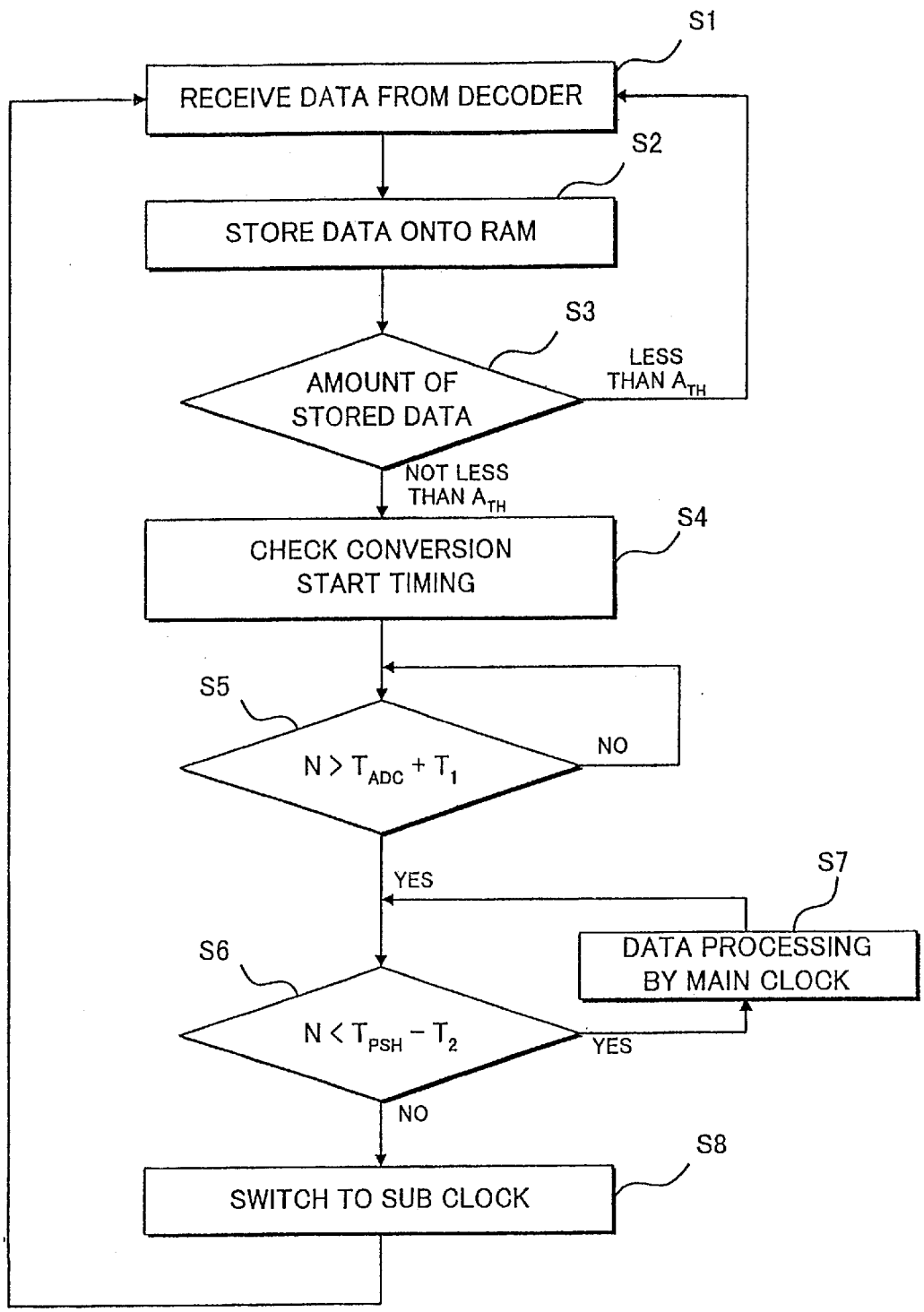
FIG. 4 is a flow chart showing a control flow of a CPU provided in the embodiment of FIG. 1.

Referring to FIG. 4, when receiving decoded data from the decoder 106 (step S1), the CPU 112 temporarily stores the received data onto the RAM 114 (step S2) and then checks whether the amount of data stored in the RAM 114 is less than a predetermined value $A_{TH}$, for example, a capacity of the RAM 114 (step S3). The steps S1–S3 are repeatedly performed while the amount of stored data is less then the predetermined value $A_{TH}$ until the battery saving turns on, that is, the radio system 101 becomes off.

When the amount of stored data reaches or becomes greater than the predetermined value $A_{TH}$, the CPU 112 determines the AD conversion start timing by checking the leading edge of each conversion start pulse $P_{ST}$ (step S4) and starts a timer counting. The CPU 112 checks whether the timer counts to $T_{ADC}+T_1$ (step S5), where $T_{ADC}$ is a time required for AD conversion of the ADC 104, that is, the pulse width of the conversion start pulse $P_{ST}$, and $T_1$ is a pre-margin which is arranged between the trailing edge of the conversion start pulse $P_{ST}$ and the beginning of the CPU main clock operation (see FIG. 5).

Figure 5:
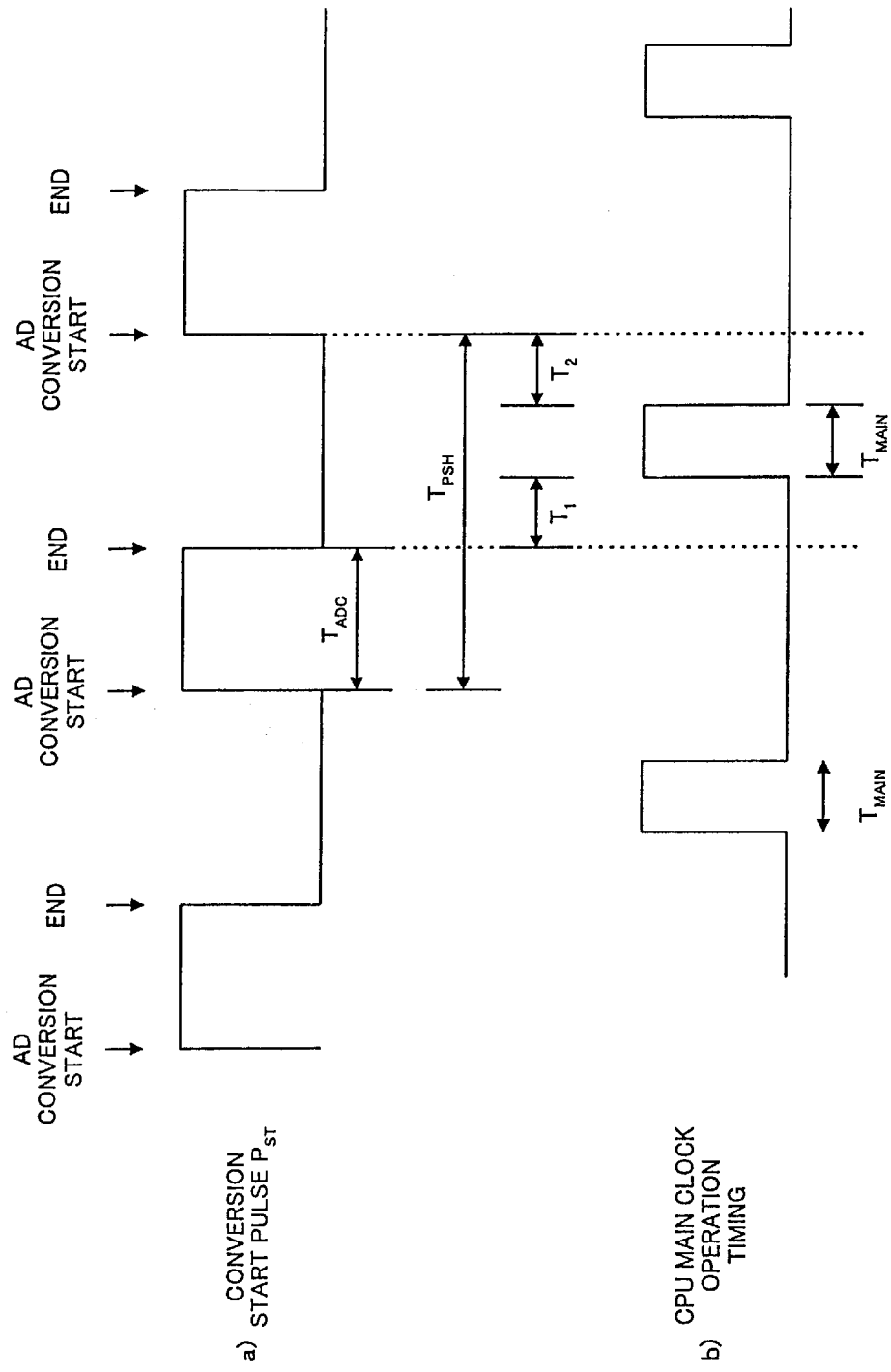
FIG. 5 is a time chart showing the data processing timing of the CPU provided in the embodiment.

When the timer counts to $T_{ADC}+T_1$ (YES In step S5), the CPU 112 starts the high-speed data processing according to the main clock and further checks whether the count of the timer is smaller than $T_{PSH}-T_2$ (step S6), where $T_{PSH}$ is a time period from the leading edge of a conversion start pulse $P_{ST}$ to that of the subsequent conversion start pulse $P_{ST}$, which is determined depending on the baud rate of the modulating signal, and $T_2$ is a post-margin which is arranged between the end of the CPU main clock operation and the leading edge of the subsequent conversion start pulse $P_{ST}$ (see FIG. 5). The CPU 112 continues performing the high-speed data processing (step S7) until the count of the timer is not smaller than $T_{PSH}-T_2$ (NO in step S6). When the count of the timer exceeds $T_{PSH}-T_2$ (NO in step S6), the CPU 112 switches into the sub clock (step S8) and then its control goes back to the step S1. Here, the sub clock has a frequency in the range from several tens to several hundreds kHz and the main clock has a frequency in the range of several MHz. Therefore, the harmonics of the main clock have larger effect on the received signal than those of the sub clock.

Referring to FIG. 5, the CPU main clock operation is performed for a period of $T_{MAIN}$ during intervals between conversion start pulses $P_{ST}$. The pre-margin $T_1$ is designed to avoid the CPU main clock operation starting during the AD conversion. The post-margin $T_2$ is designed to ensure that the CPU main clock operation is completed before the AD conversion.

In the above embodiment, the CPU 112 switches to the main clock operation based on the conversion start pulse $P_{ST}$ received from the ADC controller 111. Needless to say, the ADC controller 111 or the decoder 106 may control the main clock operation timing of the CPU 112.

As described above, the CPU 112 can perform the high-speed data processing by the main clock even in radio receiving operation unless the AD conversion is performed. In other words, the CPU 112 is stopped performing the high-speed data processing while the AD conversion is performed by the S/H 103 and the ADC 104. Therefore, the detected signal $S_{DEC}$ is not influenced by the harmonics of the main clock, resulting in stable and reliable decoded signals. Since the high-speed data processing can be performed while radio receiving operation, a larger amount of data such as a long message can be received with reliability.

What is claimed is:

1. A radio receiver for receiving an input signal, comprising:
   a detector for detecting a multi-level detected signal from the input signal;
   an AD converter for converting the multi-level detected signal to a digital signal at intervals determined based on the multi-level detected signal;
   a first controller for controlling a plurality of operations of the radio receiver, the first controller being capable of operating at both a main clock frequency and a sub clock frequency, wherein the main clock frequency is higher than the sub clock frequency, the operations including data processing of the digital signal comprising decoding the digital signal into received data, storing the received data in a memory, and processing the received data stored in the memory; and
   a second controller for controlling operation timing of the first controller such that the first controller alternates between operation at the main clock frequency and the sub clock frequency, with the first controller operating at the main clock frequency only within time periods during which the AD converter is not performing AD conversion of the multi-level detected signal.

2. The radio receiver according to claim 1, wherein the second controller comprises:
   a timing generator for generating a timing signal synchronizing with the multi-level detected signal; and
   a timing controller for controlling AD conversion timing of the AD converter in synchronization with the timing signal.

3. The radio receiver according to claim 2, wherein the timing controller generates AD conversion start pulses each causing the AD converter to start the AD conversion.

4. The radio receiver according to claim 3, wherein the first controller performs the data processing within a time period during each interval between the AD conversion start pulses.

5. The radio receiver according to claim 4, wherein the time period is set at a predetermined position during each interval between the AD conversion start pulses.

6. The radio receiver of claim 1, wherein the processing of the received data is started when the amount of the received data stored in the memory is not less than a predetermined value.

7. A radio selective call receiver for receiving an input signal, comprising:
   a detector for detecting a multi-level detected signal from the input signal;
   an AD converter for converting the multi-level detected signal to a digital signal;
   a decoder for decoding the digital signal to produce received data;
   a memory for storing the received data;
   a timing controller for controlling AD conversion timing of the AD converter such that the AD conversion is performed at intervals determined based on the multi-level detected signal; and
   a data processor for processing data to perform a plurality of operations of the radio selective call receiver, the data processor being capable of operating at both a main clock frequency and a sub clock frequency, wherein the main clock frequency is higher than the sub clock frequency, the operations including data storing and data processing of the received data, wherein the data processor operates at the main clock frequency only within time periods during which the AD conversion is not performed, and wherein the data processor operates at the sub clock frequency outside of said time periods.

8. The radio selective call receiver according to claim 7, wherein the timing controller comprises:
   a timing generator for generating a timing signal synchronizing with the multi-level detected signal; and
   an AD conversion timing controller for controlling AD conversion timing of the AD converter in synchronization with the timing signal.

9. The radio selective call receiver according to claim 8, wherein the AD conversion timing controller generates AD conversion start pulses each causing the AD converter to start the AD conversion.

10. The radio selective call receiver according to claim 9, wherein the data processor performs the data processing of the received data within time periods during each interval between the AD conversion start pulses.

11. The radio selective call receiver according to claim 7, wherein the data processor determines the time period by measuring an elapsed time from each AD conversion start pulse.

12. The radio selective call receiver according to claim 7, wherein the digital-modulated signal is a multi-level FSK (frequency shift keying) modulated signal.

13. The radio selective call receiver according to claim 7, wherein the data processor performs the data processing of the received data according to a high-frequency clock within the time period.

14. The radio receiver of claim 7, wherein the data processor monitors an amount of received data stored in the memory and starts the data processing of the received data when the amount of received data stored in the memory is not less than a predetermined value.

15. A timing control method in a radio receiver for receiving an input signal, comprising the steps of:
   a) detecting a multi-level detected signal from the input signal;
   b) converting the multi-level detected signal from analog to digital at intervals determined based on the multi-level detected signal to produce a digital signal;
   c) controlling a plurality of operations of the radio receiver, the operations including data processing of the digital signal to decode the digital signal into received data, store the received data in a memory, and process the received data stored in the memory; and
   d) controlling timing of the data processing such that the data processing is performed by a processor operating at a main clock frequency only within a time period during which analog-to-digital (AD) conversion of the step b) is not performed, and controlling timing of the data processing such that the processor operates a sub clock frequency lower than the main clock freguency while the analog-to-digital conversion is not being performed.

16. The timing control method according to claim 15, wherein the step d) comprises the steps of:
   generating a timing signal synchronizing with the multi-level detected signal; and
   controlling timing of the AD conversion in synchronization with the timing signal.

17. The method of claim 15, wherein the processing of the received data is started when the amount of the received data stored in the memory is not less than a predetermined value.

18. A timing control method in a radio selective call receiver for receiving an input signal, comprising the steps of:
   a) detecting a multi-level detected signal from the input signal;
   b) converting the multi-level detected signal from analog to digital to produce a digital signal;
   c) decoding the digital signal to produce received data;
   d) storing the received data onto a memory;
   e) controlling timing of analog-to-digital (AD) conversion of the step b) such that the AD conversion is performed at intervals determined based on the multi-level detected signal; and
   f) processing data to perform a plurality of operations of the radio selective call receiver, the operations including data storing and data processing of the received data, wherein the data processing of the received data is performed by a processor operating at a main clock frequency only within time periods during which the AD conversion is not performed, and wherein the processor operates at a lower sub clock frequency while the AD conversion is being performed.

19. The timing control method according to claim 18, wherein the step e) comprises the steps of:
   generating a timing signal synchronizing with the multi-level detected signal; and
   controlling timing of the AD conversion in synchronization with the timing signal by generating AD conversion start pulses each starting the AD conversion.

20. The timing control method according to claim 19, wherein the data processing of the received data is performed within a time period during each interval between the AD conversion start pulses.

21. The method of claim 18, wherein the processing step further comprises monitoring an amount of received data stored in the memory and starting the data processing of the received data when the amount of the received data stored in the memory is not less than a predetermined value.

* * * * *